(12) United States Patent
Matsushita

(10) Patent No.: US 6,504,270 B1
(45) Date of Patent: Jan. 7, 2003

(54) UNINTERRUPTIBLE SWITCHING REGULATOR

(75) Inventor: Hiromi Matsushita, Amagasaki (JP)

(73) Assignee: Nihon Protector Co., Ltd., Hyogo (JP)

( * ) Notice: Subject to any disclaimer, the term of this patent is extended or adjusted under 35 U.S.C. 154(b) by 35 days.

(21) Appl. No.: 09/680,300

(22) Filed: Oct. 6, 2000

(30) Foreign Application Priority Data

Feb. 7, 2000 (JP) ........................................ 2000-029459

(51) Int. Cl.$^7$ ................................................ H01H 9/54
(52) U.S. Cl. ...................... 307/140; 307/64; 307/66; 307/125; 307/126; 307/139
(58) Field of Search ...................... 307/140, 125, 307/126, 64, 66, 139

(56) References Cited

U.S. PATENT DOCUMENTS 5,010,314 A * 4/1991 Estrov ........................ 336/198
5,602,726 A * 2/1997 Sakai ........................... 363/55
5,978,234 A * 11/1999 Nagahira ...................... 363/19

* cited by examiner

*Primary Examiner*—Stephen W. Jackson
*Assistant Examiner*—Robert L. Deberadinis
(74) *Attorney, Agent, or Firm*—Armstrong, Westerman & Hattori, LLP

(57) ABSTRACT

It is an object of the present invention to provide an uninterruptible switching regulator with which smaller size and lower cost can be achieved while the power supply efficiency is raised, which is accomplished by the effective utilization of an RCC type switching circuit. When the commercial AC input power supply 1 is operating normally, the AC-side RCC type switching circuit 21 is operated preferentially to supply power to the secondary drive circuit 25, but when there is a power outage with the commercial AC power supply 1, the DC-side RCC type switching circuit 69 is operated to supply power to the secondary drive circuit 25, and these two switching circuits can be switched at high speed.

5 Claims, 12 Drawing Sheets

UNINTERRUPTIBLE SWITCHING REGULATOR

BACKGROUND OF THE INVENTION

1. Field of the Invention

The present invention relates to an uninterruptible switching regulator in which an AC-side RCC (Ringing Choke Converter) type switching circuit drives a secondary drive circuit for driving a load such as a computer board when the commercial AC power supply is operating normally, and in the event of an unexpected situation such as a power outage, the system is automatically switched over so that the secondary drive circuit is instead driven by a DC-side RCC (Ringing Choke Converter) type switching circuit, and more particularly relates to an uninterruptible switching regulator configured such that an iron core and a magnetic path is shared by the AC-side RCC type switching circuit, the DC-side RCC type switching circuit, and the secondary drive circuit that connect a high-frequency transformer, the result of which is that a switching operation is performed between the switching element on the primary side and the switching element on the tertiary side in the supply of DC output to the secondary drive circuit. The present invention further relates to an uninterruptible switching regulator for a wide variety of computer applications; for instance, it can be used with a commercial AC power supply alone, it can be used with an external DC power supply alone, it can be used for automotive applications, and it affords uninterrupted operation through the double input of a commercial AC power supply and an external DC power supply.

2. Description of the Related Art

In Windows 95, 98, and NT, Linux, and other such operating systems used in personal computers, if the AC input power supply is accidentally turned off all of a sudden or if a power outage occurs during OS operation, for example, a memory failure can occur on the hard disk or, in a worst case, the OS can be damaged, requiring professional help for restarting the computer, and there has been a tremendous need in recent years for a way to deal with this situation. FIG. 13 illustrates a common approach to this problem, in which a UPS (Uninterruptible Power Supply) is connected to the computer in series, ahead of the internal AC/DC switching power supply. Still, cost concerns often dictate the use of an inexpensive UPS, and because a device with low reliability is serially connected between the computer and the commercial power supply, there is actually an attendant drawback of lower reliability, extra space is required, and the cost is also proportionately higher. FIG. 14 illustrates another method, which is often used on the existing internal switching power supply side. This is often used as a POS (Point Of Sale) system in which the commercial AC power supply is used to charge a battery that works by floating operation with an AC/DC switching power supply, and a DC/DC converter with multiple outputs put together into an integral structure on this load side is used as an internal uninterruptible switching regulator. Demand for this has been on the rise of late, as personal computers are increasingly used for POS systems. As another application, this system is also frequently used as an electronic switching device in PBX apparatus, and as personal computers make inroads in this area as well, uninterruptible switching regulators are again being used.

An advantage to the system shown in FIG. 14 is that the circuit is simple, but drawbacks are poor efficiency (50 to 55%), larger size, higher cost, and greater energy consumption, which is a problem from a societal and environmental standpoint.

Poor efficiency is due to the fact that the AC/DC conversion switching power supply and the DC/DC converter are connected in series, so the overall efficiency is the product of multiplying the efficiency of the various power supplies.

For instance, when an AC/DC conversion switching power supply with an efficiency of 70% is connected in series with a DC/DC converter with an efficiency of 80%, multiplying the numerical values of the efficiency of the two produces an efficiency of 56%, and a drawback is that the apparatus must be larger in order to obtain a large output.

Another major drawback is that because the battery is connected to the ground terminal of the computer board that is the load, maintenance, it is difficult to facilitate maintenance, including battery management by providing the batteries of a plurality of computers separately outside and in common. Also, the present inventors have already commercialized an uninterruptible switching power supply of medium capacity (150 to 400 W), but when a small-capacity supply (40 to 100 W class) is produced with this medium capacity system, called a separately excited forward converter, the circuit becomes more complicated and there are more parts, which makes it difficult to keep the size compact and the cost low.

As personal computers have become smaller and lower in capacity in recent years, micro-ATX specifications, SFX specifications, and same-device power supply specifications with panel computers and the like have been published, and there is a need for smaller packages. A continuous output of approximately 100 W must be obtainable with a case size of 100 mm in width, 63.5 mm in height (thickness), and 125 mm in depth, and among multiple outputs, low voltage outputs of 5 V and 3.3 V require a capacity of 70 to 80 W, but since the efficiency of an ordinary RCC type switching power supply is only about 60%, 40 to 50 W is generally the limit with a low voltage output.

SUMMARY OF THE INVENTION

In light of the above, it is an object of the present invention to provide an uninterruptible switching regulator with which smaller size and lower cost can be achieved while the power supply efficiency is raised, which is accomplished by the effective utilization of an RCC type switching circuit.

In order to achieve the stated object, the uninterruptible switching regulator of the present invention is such that an AC-side RCC type switching circuit equipped with a switching element, which rectifies and converts into DC an AC voltage from a commercial AC power supply serving as the input source and then operates using the smoothed DC voltage as its input, is connected to the primary winding of a high-frequency transformer, there is provided an input voltage detection circuit that detects when the input voltage from the commercial AC power supply to the AC-side RCC type switching circuit drops below a set voltage, a secondary drive circuit for driving a load such as a computer board is connected to the secondary winding of the high-frequency transformer, a DC-side RCC type switching circuit equipped with a switching element, which is completely electrically insulated from the AC-side RCC type switching circuit and the secondary drive circuit and operates using a battery, an external DC power supply, or the like as its input source, is connected to the tertiary winding of the high-frequency transformer, there is provided high-speed switching means for switching at high speed the operation of the AC-side RCC type switching circuit and the DC-side RCC type switching circuit on the basis of the detection information from the input voltage detection circuit, when the input voltage detection circuit detects that the input voltage from the commercial AC power supply is at or above the set voltage, the operation of the DC-side RCC type switching circuit is halted and power is supplied to the secondary drive circuit by preferentially operating the AC-side RCC type switching circuit with an output command from the input voltage detection circuit, and when the input voltage detection circuit detects that the input voltage from the commercial AC power supply has dropped below the set voltage, power is supplied to the secondary drive circuit by operating the DC-side RCC type switching circuit and halting the operation of the AC-side RCC type switching circuit with an inverse output command from the input voltage detection circuit.

To obtain an output of, say, about 100 W, which is required for a micro-ATX power supply size of determined case size of 100×63.5×125 mm as mentioned above, or to meet the need for an uninterruptible switching power supply that is as compact as possible even when used for a panel computer or a one-box server that uses Linux or the like for its OS, the system of the present invention is used as the basis, in which the circuit type is RCC, these two RCC type circuits, namely, the AC-side RCC type switching circuit and the DC-side RCC type switching circuit, are controlled independently, and these two circuits and the secondary drive circuit are shared via a high-frequency transformer. The circuitry can be simplified by using a configuration in which the abovementioned two circuits are switched on the basis of detection information from a single input voltage detection circuit. Also, providing a high-speed switching means for performing operation switching at high speed prevents a drop in secondary output. With a structure such as this, despite the smaller size, efficiency can be raised to over 70% not only with commercial AC input, but also with battery input (including external serial input).

There is provided a comparative amplifying element with an internal reference voltage for keeping the DC output to the secondary drive circuit at a constant voltage, the photo-diode sides of two photo-couplers are connected to the output terminal of this comparative amplifying element, either serially or in parallel via a balance resistor, the photo-transistors of the two photo-couplers are disposed one in the AC-side RCC type switching circuit and the other in the DC-side RCC type switching circuit, the collector terminals of the two photo-transistors are connected to the feedback input terminals of a PWM control IC used to control the switching circuits, the emitter terminals of the two photo-transistors are connected to the ground terminal of the PWM control IC, there are provided two transistors whose collector terminals are connected to the collector terminals of the two photo-transistors and whose emitter terminals are connected to the emitter terminals thereof (including cases when there is a certain amount of impedance in the connection), the base terminals of the two transistors and the input voltage detection circuit are connected such that the output commands from the input voltage detection circuit can be transmitted to the two base terminals in a mutually inverted state, and an RCC partial resonance type control IC, or an IC having substantially the same function as said IC, or a control circuit having substantially the same function as said IC, is used as the PWM control IC.

When the input voltage from the commercial AC power supply is at or above the set voltage, the transistor connected to the feedback terminal of the PWM control IC of the DC-side RCC type switching circuit is turned on by an output command from the input voltage detection circuit, and one of the photo-transistors that serve as the feedback signal of the PWM control IC is short-circuited, thereby bypassing the feedback current and halting the oscillation of the PWM control IC, which halts the supply of power to the secondary drive circuit from the DC-side RCC type switching circuit.

Conversely, an OFF command from the input voltage detection circuit is given to the transistor connected to the feedback terminal of the PWM control IC of the AC-side RCC type switching circuit, so the photo-transistor connected in parallel with this transistor remains in an operating state, and the output of the PWM control IC is in an oscillating state, so the AC-side RCC type switching circuit performs a switching operation and power to the secondary drive circuit is supplied from this switching circuit.

When the input voltage from the commercial AC power supply drops below the set voltage, the output of the input voltage detection circuit is inverted, because the control transistor turns on, the photo-transistor controlling the feedback terminal of the PWM control IC of the AC-side RCC type switching circuit is halted, the transistor connected to the feedback terminal of the PWM control IC of the DC-side RCC type switching circuit is turned off, and the photo-transistor connected to this terminal is put in an operating state, the result of which is that the output of the PWM control IC is in an oscillating state, the DC-side RCC type switching circuit performs a switching operation, and power to the secondary drive circuit is supplied from this switching circuit.

By using an RCC partial resonance type control IC, or an IC having substantially the same function as this IC, or a control circuit having substantially the same function as this IC, for the PWM control IC as the means for raising the efficiency of the above-mentioned RCC system, there is a reduction in loss during switching, there is less switching noise, and it is easier to deal with EMI.

If the high-speed switching means comprises a high-speed insulated inverting amplifier consisting of a photo-coupler or the like for optically linking the two switching circuits by the photo-transistors provided to the DC-side RCC type switching circuit and the photo-diodes provided to the AC-side RCC type switching circuit, and a clamping Zener diode provided between the collectors and emitters of the photo-transistors, then high-speed response can be achieved without the photo-couplers having to have a super-high-speed structure.

Also, if these transistors are connected by Darlington connection to the emitter ends of the photo-transistors, diodes are serially connected in the forward direction to the collector side of these transistors, and the cathode sides of these diodes are connected to the feedback terminals of the PWM control IC, the forward voltage of the diodes can be utilized so that the feedback terminals of the PWM control IC will not be drawn too deeply into the ground (GND) potential, allowing even better high-speed response to be achieved.

There are provided two supply circuits for supplying voltage to the PWM control IC used in the DC-side RCC type switching circuit, one of the supply circuits is equipped with a first electronic switch that passes the DC voltage from the battery, external DC power supply, or the like through a starting circuit and closes only while charging current is flowing to a starting capacitor, the other supply circuit is equipped with a second electronic switch for supplying the DC-side PWM control IC with auxiliary voltage made by rectifying the induced voltage of the tertiary winding after the supply of DC voltage from the first electronic switch has been received and the high-frequency transformer is in an oscillating state, and there are provided shutdown processing means for performing shutdown processing by outputting a computer end command when the input voltage detection circuit detects that the input voltage of the commercial AC power supply has dropped below the set voltage, and switch-off means for switching the second electronic switch off and turning the DC-side switching element off by a command from the photo-couplers upon completion of the processing by the shutdown processing means.

After the above shutdown processing, the switching of the DC-side RCC type switching circuit can be halted to halt the supply of power to the secondary side, and the DC-side switching element can be made to double as a power switch, with which the DC-side RCC type switching circuit can be shut off to keep dark current caused by wasted discharge down to just a few micro-amps.

A resonance capacitor is connected to either the winding end portion of the primary winding or the winding end portion of the tertiary winding, and the secondary drive circuit is provided with a synchronous rectifying circuit in which two FET's are connected in totem pole fashion to a DC/DC converter circuit that makes a low-voltage large-current output and a polymer semiconductor capacitor or a capacitor with substantially the same low equivalent serial resistance as a polymer semiconductor capacitor.

When an electrolytic capacitor is used as a smoothing capacitor provided to the secondary drive circuit in an RCC system, 5 V and 10 A is the limit, the equivalent serial resistance (ESR) of this capacitor becomes a problem, a large amount of heat is generated, and heat treatment and a service life of 5 to 7 years cannot be expected, so a polymer semiconductor capacitor or a capacitor with substantially the same low equivalent serial resistance as a polymer semiconductor capacitor (at the same size, the equivalent serial resistance (ESR) of an electrolytic capacitor is 1:5, so that of a polymer semiconductor capacitor is far lower, and when the permissible ripple current is compared, a permissible current that yields 5:1 is obtained) is employed, which affords better efficiency and a smaller size. The circuitry can be simplified by connecting the resonance capacitor to either the winding end portion of the primary winding or the winding end portion of the tertiary winding. This is because the primary winding and tertiary winding that make up the magnetic circuit are linked in an equivalent parallel state, so providing the resonance capacitor to just one allows the same action to be imparted to the other. Efficiency can be further enhanced by using a synchronous rectifying circuit in which the main output on the secondary side is set at +12 V, for example, and two FET's connected in totem pole fashion are used as rectifying elements as the way of making two voltages, such as 5 V and 3.3 V, with a DC/DC converter that makes voltage by chopper method from this +12 V voltage.

The high-frequency transformer comprises an iron core, an inner secondary winding around the iron core, whose number of turns is substantially half the total number of turns of the secondary winding, a tertiary winding wound via an interlayer insulator around the outside of this inner secondary winding, a primary winding that is a high-voltage winding wound via an interlayer insulator around the outside of this tertiary winding, and an outer secondary winding around the outside of this primary winding, whose number of turns is the remainder of subtracting the number of turns of the inner secondary winding from the total number of turns of the secondary winding, the inner secondary winding, the tertiary winding, and the outer secondary winding are made from flat copper boards, and the winding width of the inner secondary winding, the tertiary winding, and the outer secondary winding is the same as the winding width of the primary winding made of round wire.

To minimize the lead inductance of the windings of the high-frequency transformer and the wiring inductance on the secondary side of the high-frequency transformer as above, flat copper plates are used for the secondary winding and tertiary winding, the secondary winding is divided into an inner secondary winding and an outer secondary winding, and these are disposed in a special way and made thick and short, which reduces parasitic inductance, reduces the range and amount of cross-boarding (the region where the drain current and voltage overlap) when the FET that is a switching element is turned off, and allows efficiency to be increased and noise reduced.

DESCRIPTION OF THE PREFERRED EMBODIMENTS

Figure 1:
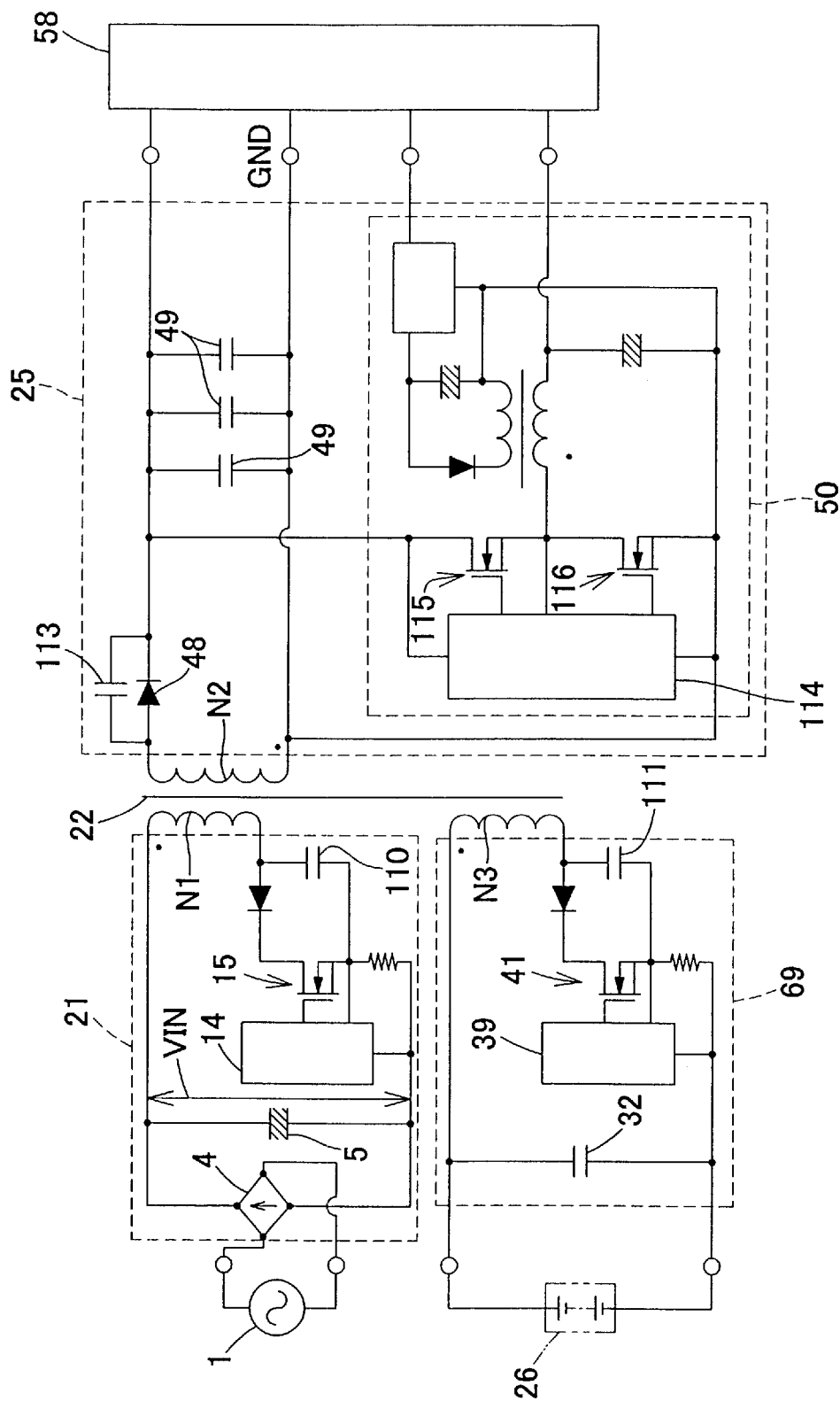
FIG. 1 is a simplified circuit diagram illustrating the main components where efficiency has been enhanced.

FIG. 1 is a simplified circuit diagram of an uninterruptible switching regulator with improved efficiency. Only the main components are shown. The secondary output shown in FIG.

Figure 4:
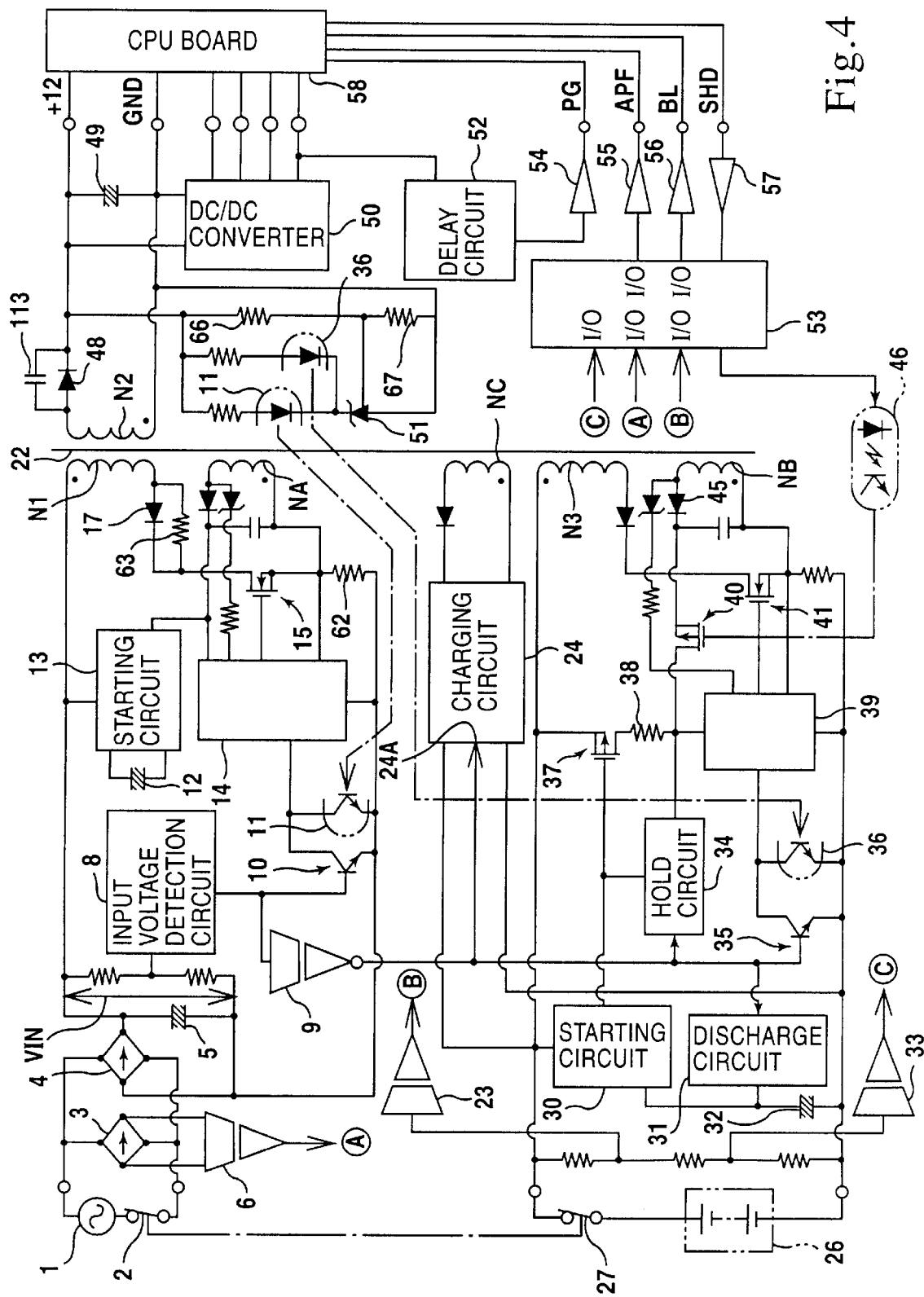
FIG. 4 is a circuit diagram of the overall structure of the present invention.

1 shows three outputs of +12 V, −12 V, and +5 V, for example, but the structure may have five outputs as in FIG. 4, and the number of these outputs can be varied as desired.

With this uninterruptible switching regulator, the main constituent circuits comprise an AC-side RCC type switching circuit (hereinafter referred to as AC-side RCC circuit) 21 that rectifies and converts into DC an AC voltage from a commercial AC power supply 1 and then operates using the smoothed DC voltage as its input and that is connected via a primary winding Ni of a high-frequency transformer 22, a secondary drive circuit 25 that is connected via a secondary winding N2 of the high-frequency transformer 22 and that is used to drive a computer (CPU) board 58 as an example of load, and a DC-side RCC type switching circuit (hereinafter referred to as battery-side RCC circuit) 69 that is connected via a tertiary winding N3 of the high-frequency transformer 22 and operates using a battery 26 as its input source.

When power from the commercial AC power supply 1 is applied, the power passes through a rectifying bridge 4 and undergoes full wave rectification, this rectified voltage is smoothed by a smoothing capacitor 5, and a DC input voltage VIN is obtained. The AC-side RCC circuit 21 performs a switching operation using this DC input voltage VIN as its input. The AC-side RCC circuit 21, which will be described in detail in a later section, performs switching operation in precedence over the battery-side RCC circuit 69 when the AC input voltage is at a normal level, and power is supplied as output to the secondary side via the high-frequency transformer 22. The RCC partial resonance circuit employed to improve efficiency comprises the primary winding Ni and a first oscillating capacitor 110, and the secondary winding N2 and a third oscillating capacitor 113, and performs control for the improvement of efficiency during AC operation by the AC-side RCC circuit 21. In the event that the AC input voltage drops below the specified level or is nonexistent due to a power outage or the like, the battery-side RCC circuit 69 supplies power as output to the secondary side via the high-frequency transformer 22, and here again, just as with the AC side, the RCC partial resonance circuit employed to improve efficiency comprises the tertiary winding N3 and a second oscillating capacitor 111, and the secondary winding N2 and the third oscillating capacitor 113, and performs control for the improvement of efficiency. However, since the primary winding Ni and the tertiary winding N3 are linked in an equivalent parallel state, either of the oscillating capacitors 110 and 111 can be omitted here. This control is performed using an AN8028 or AN8037 (made by Matsushita) as the RCC partial resonance IC for the PWM control IC 14.

Figure 8:
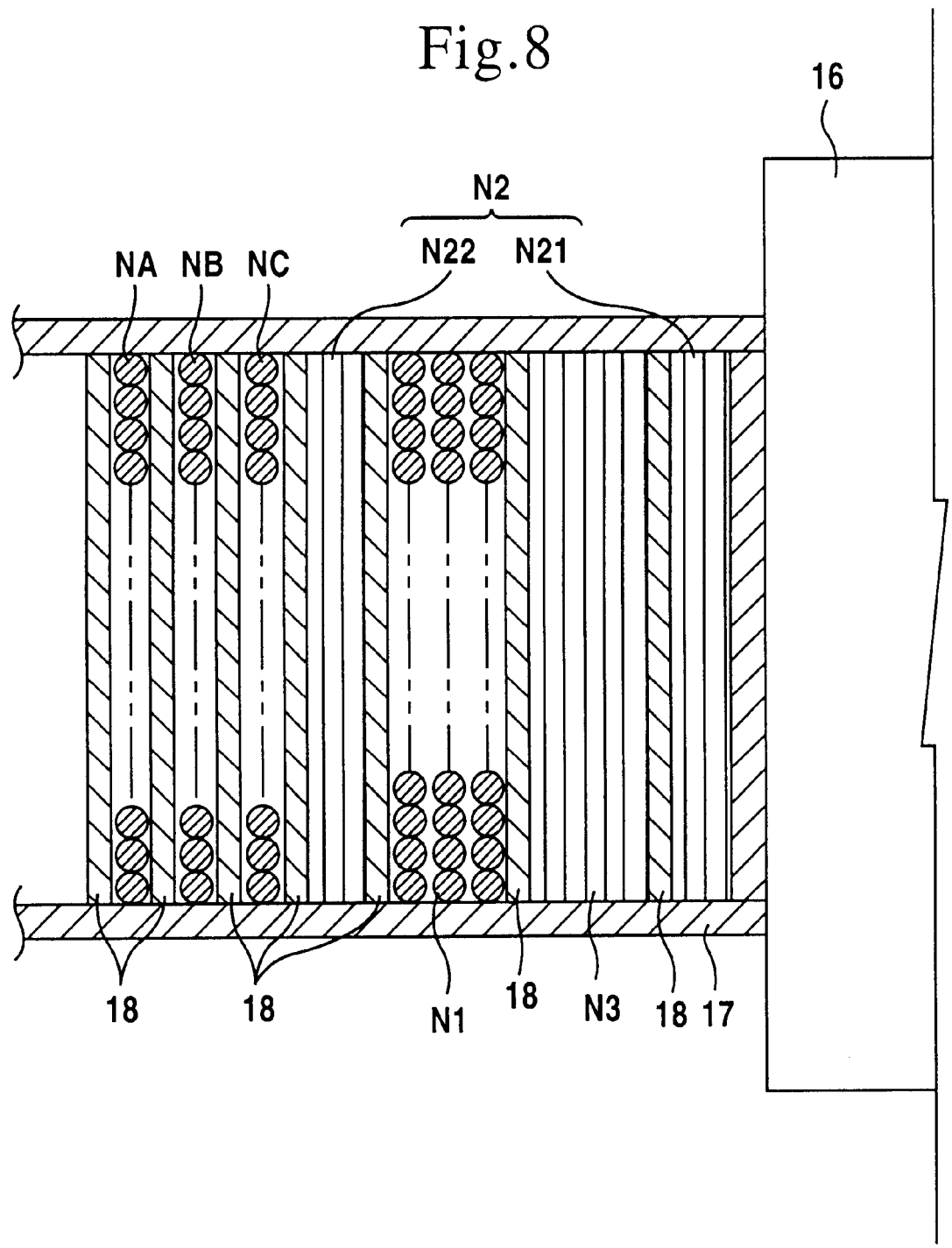
FIG. 8 is a cross section of the winding structure of the high-frequency transformer used to achieve higher efficiency.
Figure 9:
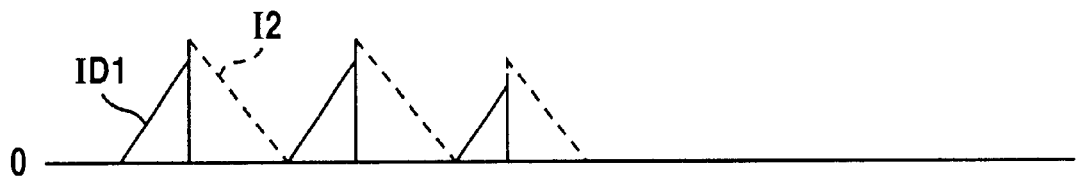
FIG. 9 is a diagram illustrating the relationship of secondary DC output current and primary and secondary current waveforms to the high-frequency transformer.
Figure 9:
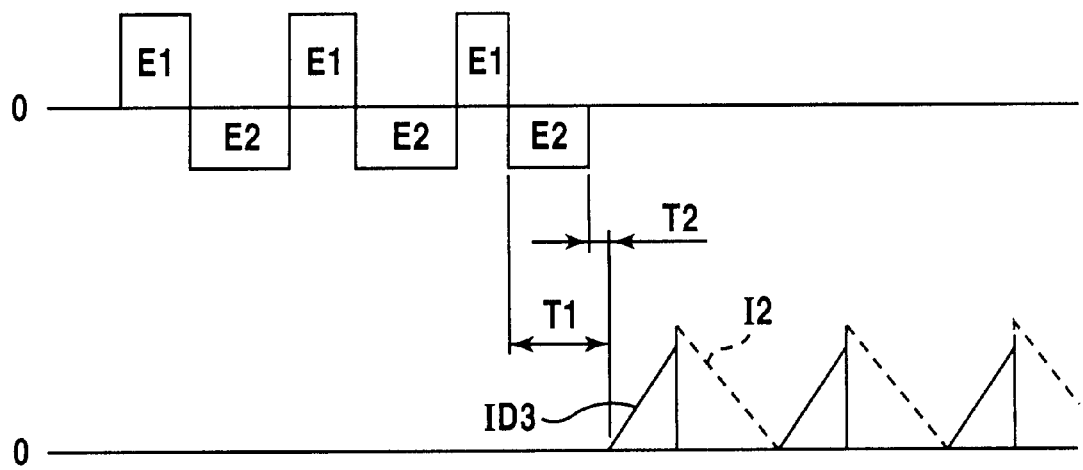
Figure 9:
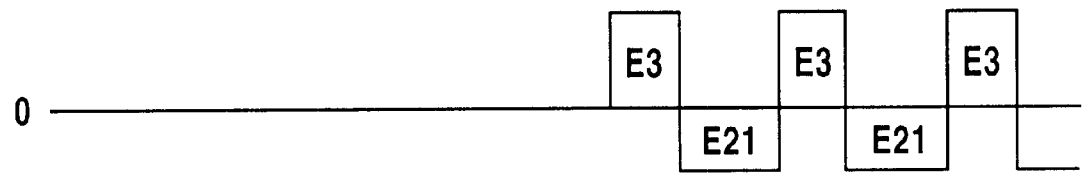
Figure 9:
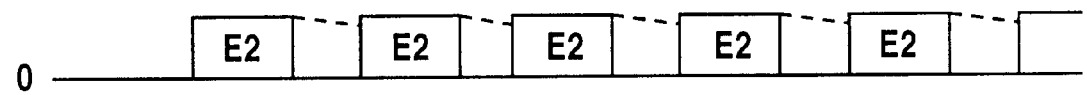
Figure 10:
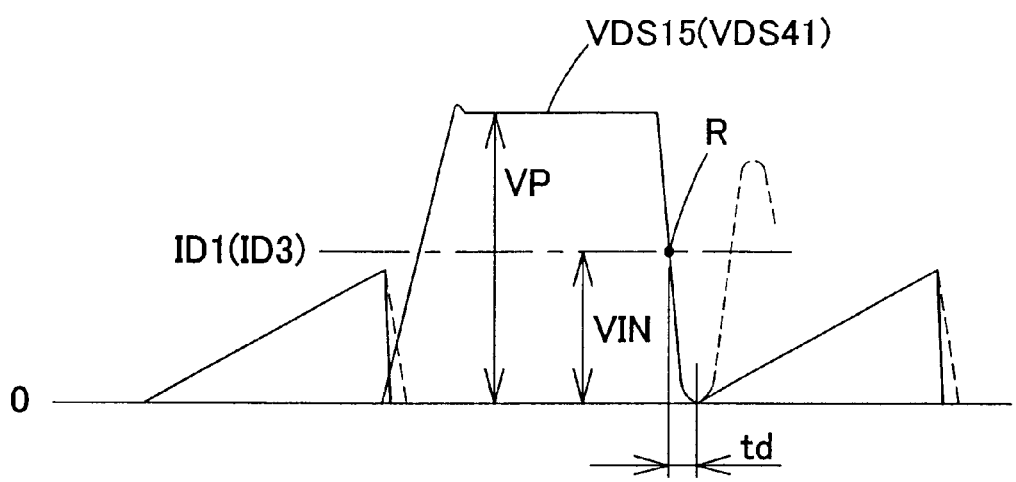
FIG. 10 is a diagram illustrating the relationship of the ON current waveform and the OFF voltage waveform of a switching element.

FIG. 9 shows the relationship between the drain current ID1, the voltage E1 of the primary winding N1 of the transformer 22, the voltage E2 of the secondary winding N2, and secondary current I2. A state of voltage oscillation is shown in FIG. 10, in which the drain current ID1 flows in a triangular wave shape as an exciting current to the N1 winding when the FET (may instead be a transistor) 15 that is an example of the switching element is on, and the current drops off at an angle as indicated by the broken line when the FET 15 is turned off at the peak point. This is due to leakage current caused by leakage inductance and parasitic inductance of the secondary winding N2 of the high-frequency transformer 22, and a drop that is more vertical, as indicated by the solid line, allows for a reduction in the crossover surface area with the recovery voltage VDS15 when the FET 15 is off, that is, in the switching loss when the FET 15 is off. This loss is generally held to be greatest with a switching power supply. The improvement in efficiency of the present invention is accomplished by modifying the structure of the high-frequency transformer 22, and the winding and construction of the high-frequency transformer 22 are shown in FIG. 8. In other words, in order to reduce the above-mentioned parasitic inductance (that is, inductance caused by transformer winding length) and leakage inductance and thereby improve the coupling of the main winding, the primary winding N1 and tertiary winding N3 are sandwiched between an inner secondary winding N21 and an outer secondary winding N22, wherein the number of windings of the secondary winding N2 is divided substantially in half (with the present invention, the division in half is by parallel winding), and since the windings N2 and N3 are low in voltage and high in current, inductance is reduced by using flat copper plates, allowing the off current of the ID1 in FIG. 10 to approach the solid line. 16 in FIG. 8 is an iron core, 17 is a bobbin, and 18 is an insulating tape. NA and NB are auxiliary windings for switching feedback, and NC is a winding for a charging circuit 24. When the first oscillating capacitor 110 is connected as in FIG. 1, the off recovery voltage VDS15 of the FET 15 rises at an angle as in FIG. 10, so there is a drop in the crossover surface area of the ID1 and VDS15. Specifically, off loss is markedly reduced. When the FET 15 is on, the reset point R of the high-frequency transformer 22 is detected by the PWM control IC 14, the FET 15 is turned on at the zero cross point by the oscillating voltage that resonates with the inductance of the primary winding Ni and the first oscillating capacitor 110, and the drain current ID1 is started up from zero after a specific time td has elapsed from the reset point R, so the turn-on loss of the FET 15 is close to zero and higher efficiency is realized. The capacity of the third oscillating capacitor 113 connected in parallel to a rectifying diode 48 of the secondary winding N2, and the inductance and leakage inductance of the secondary winding N2 are all calculated as a winding ratio to the primary winding N1 side.

When the commercial AC input voltage goes out, the battery-side RCC circuit 69, which is depicted as a circuit block, takes over for the AC-side RCC circuit 21. The operation here is based on the same principle as with the AC-side RCC circuit 21. A difference in the input voltage VIN value results in different values for the drain voltage VDS41 and the drain current ID3, but the waveforms are substantially the same as shown FIG. 10, and will therefore not be described again here. Next, in FIG. 9, when normal input operation switches over to operation by the battery-side RCC circuit 69 due to a power outage, ideally, an FET (may be a transistor instead) 41, which is an example of the switching element of the battery-side RCC circuit 69, is turned on and ID3 flows only after the voltage E2 of the high-frequency transformer 22 and the secondary winding current I2 drop to zero and have been completely reset, but because a response lag occurs in the input voltage detection circuit 8 and the high-speed insulated inverting amplifier 9 that are in the AC-side RCC circuit 21, there is a delay in the switching of the operation to the battery-side RCC circuit 69, and this can lead to a drop in output voltage. The way this response is improved will be described through reference to FIG. 2. The commercial AC input voltage is processed by dividing the double-end voltage VIN of the smoothing capacitor 5 to a specific value with potential detection resistors 59 and 60, after which it is inputted to an inverted input (−) as the detection voltage of a comparator 79. At the common phase input terminal (+) of this comparator 79, the voltage from an AC-side auxiliary power supply VCC14 is supplied to a Zener diode 71 via a current limiting resistor 72 of the Zener diode 71 that makes the reference voltage thereof, and a reference voltage is made and supplied from this supplied voltage by a potential resistor 73 and a positive feedback resistor 74 for imparting hysteresis characteristics. When the commercial AC input power supply 1 is operating normally, the output of the comparator 79 is in an "L" state, that is, an on state, the photo-diode of an insulating photo-coupler 80 connecting the primary and tertiary sides lights up, and the photo-transistor 80 sic is on. The anode side of a level shifting Zener diode 77 is connected at the base of a transistor 10 connected via a limiting resistor 81 to a feedback terminal FB of the control IC 14 of this AC-side RCC circuit 21. Because the comparator 79 is at "L"the base current of the transistor 10 is cut off, the transistor 10 is turned off, a secondary constant-voltage controlling photo-coupler 11 becomes operable, the out terminal of the control IC 14 oscillates, the FET 15 performs a switching operation, triangular wave current that is ID1 shown in FIG. 9 flows, and power is supplied to the secondary drive circuit 25.

At this point, since the transistor side of the photo-coupler 80 is on, the voltage of an auxiliary power supply VCC39 for the battery-side RCC circuit is supplied to the base of a transistor 35 through the photo-coupler 80 and via a resistor 83, which turns on the transistor 35. A collector of 19 the oscillation switching transistor 35 is connected to the feedback terminal FB of a control IC 39 for the battery-side RCC circuit via a resistor 86 that limits feedback current and a level shifting diode 87 connected in the forward direction. The feedback terminal FB is drawn to the VF voltage of the diode 87 because the transistor 35 is on. In this voltage state, the control IC 39 does not oscillate and the FET 41 is off.

The roles of a clamping Zener diode 84 and the diode 87 will now be described, but in short they speed the switching from AC-side RCC circuit 21 operation to battery-side RCC circuit 69 operation. The reason the response of the photo-coupler is slow is that an equivalent floating capacity 123 indicated by the broken line is present between the collector and emitter of the photo-transistor 80, and without the clamping Zener 84, the VCC39 voltage will go through the resistor 83 and through the storage capacity 123 and continue sending base current to the transistor 35 for a longer time during switching, that is, when the photo-transistor 80 is turned off, but the photo-transistor 80 will be turned off faster if the collector thereof is clamped with the low Zener voltage 84.

The diode 87 also serves to speed response, but is used because if there is no diode 87, the transistor 35 will go deeply into the on region, and the collector potential recovery of the transistor 35 will again be slower when the transistor 35 is turned off.

Rather than doing this, it is of course also possible to use a super-high-speed photo-coupler, but the above method is employed in the present invention for the sake of cost and safety-approved parts.

When the commercial AC power supply 1 then goes out, the double-end voltage VIN of the smoothing capacitor 5 decreases, so the potential of the inversion input terminal (−) of the comparator IC 79 drops below that of the common phase terminal (+) to which the reference voltage is applied, so the output of the comparator 79 goes to an "H" state, and the current flowing to the photo-diode of the photo-coupler 80 is shut off.

Therefore, the potential of the cathode of the level shifting Zener diode 77 rises, exceeding the Zener voltage of the Zener diode 77, so the current coming from the VCC14 through the resistor 76 passes through the Zener diode 77, and enough current to turn on the transistor 10 flows as the base current thereof. Accordingly, because the collector of the photo-transistor of the secondary constant-voltage controlling photo-coupler 11 is drawn to "L," the FB terminal of the control IC 14 of the AC-side RCC circuit also becomes "L," the output terminal OUT of this IC 14 stops oscillating, the FET 15 is cut off, and the supply of output to the secondary side is halted.

At this point, the photo-transistor 80 simultaneously turns off, but the storage capacity 123 is bypassed, and current continues to flow to the transistor 35 through a time lag resistor 83 corresponding to the capacity of this storage capacity 123, so there is a short delay in turning off this transistor 35. If, however, the emitter and collector of the photo-transistor 80 are clamped to a low Zener voltage by the clamping Zener diode 84, the storage capacity 123 will be charged up in a shorter time. That is, the lag time in turning off the transistor 35, which becomes the switching time, is shorter.

Once the transistor 35 turns off, a secondary control photo-coupler 36 on the battery side immediately enters an operating state, the feedback terminal FB of the battery-side RCC control IC 39 also enters an operating state, an oscillation output is obtained at the output terminal OUT thereof, the gate of the FET 41 is driven, and a switching operation supplies secondary output from the battery-side RCC circuit 69 to the secondary drive circuit 25 instead of to the AC-side RCC circuit 21. The switching time T1 that elapses here is characterized in that adjustment aimed at bringing T2 (includes T1 in the state shown in FIG. 9) as close to zero as possible is performed by selection of the constants of the resistors 83 and 85 and the Zener voltage 84, and selection of the photo-coupler 80.

Switching frequently occurs at the pulsing of the AC voltage and causes instability if there is no hysteresis in the input voltage detection circuit as the AC voltage is rising back to its former level from its lowered state.

Figure 2:
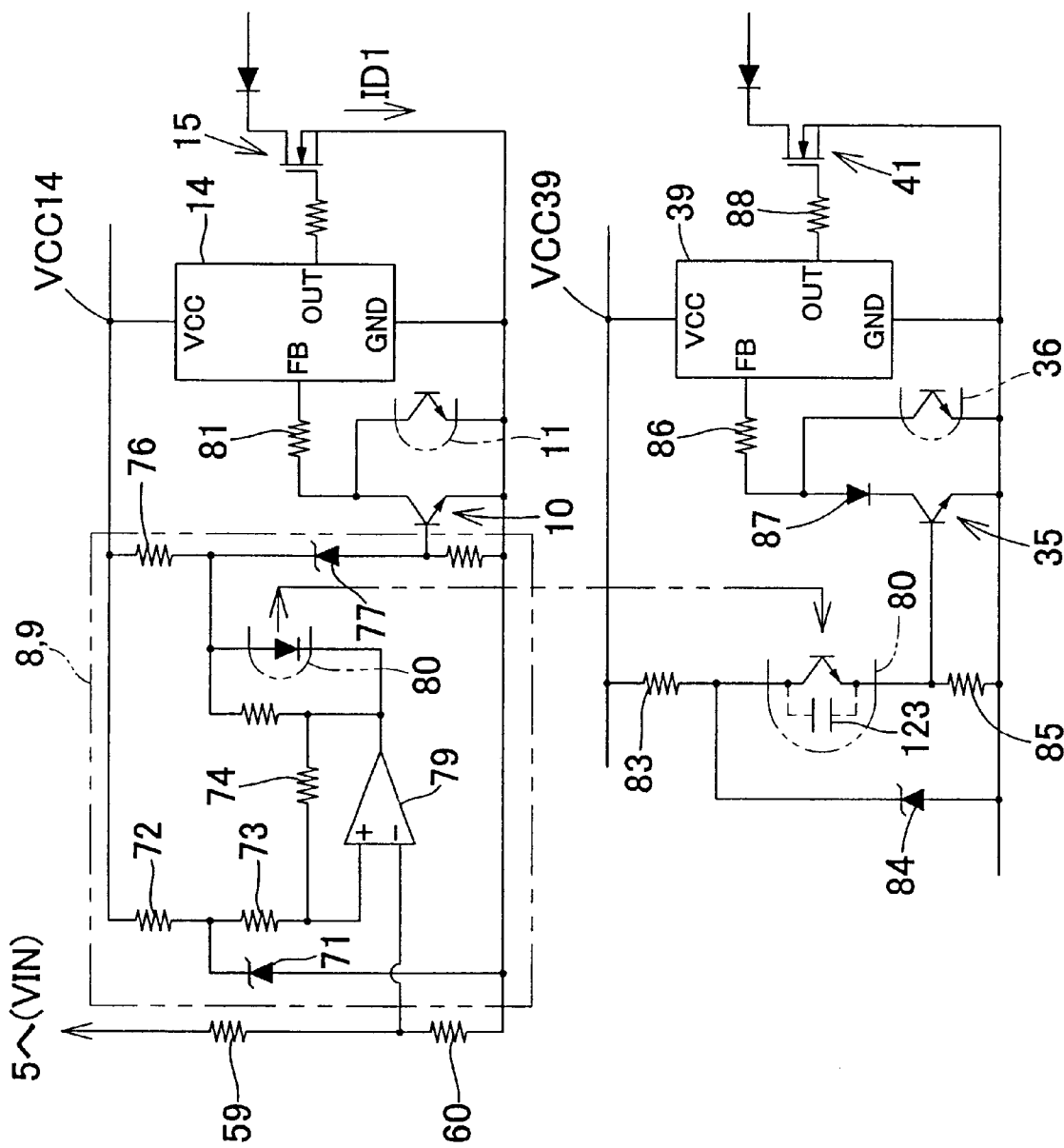
FIG. 2 is a simplified circuit diagram illustrating the switching of the AC-side and battery-side RCC circuit drive and the input voltage detection circuit.

This hysteresis is made by the resistor 74 inputted to the common phase terminal (+) and output terminal of the comparator 79 in FIG. 2.

Figure 6:
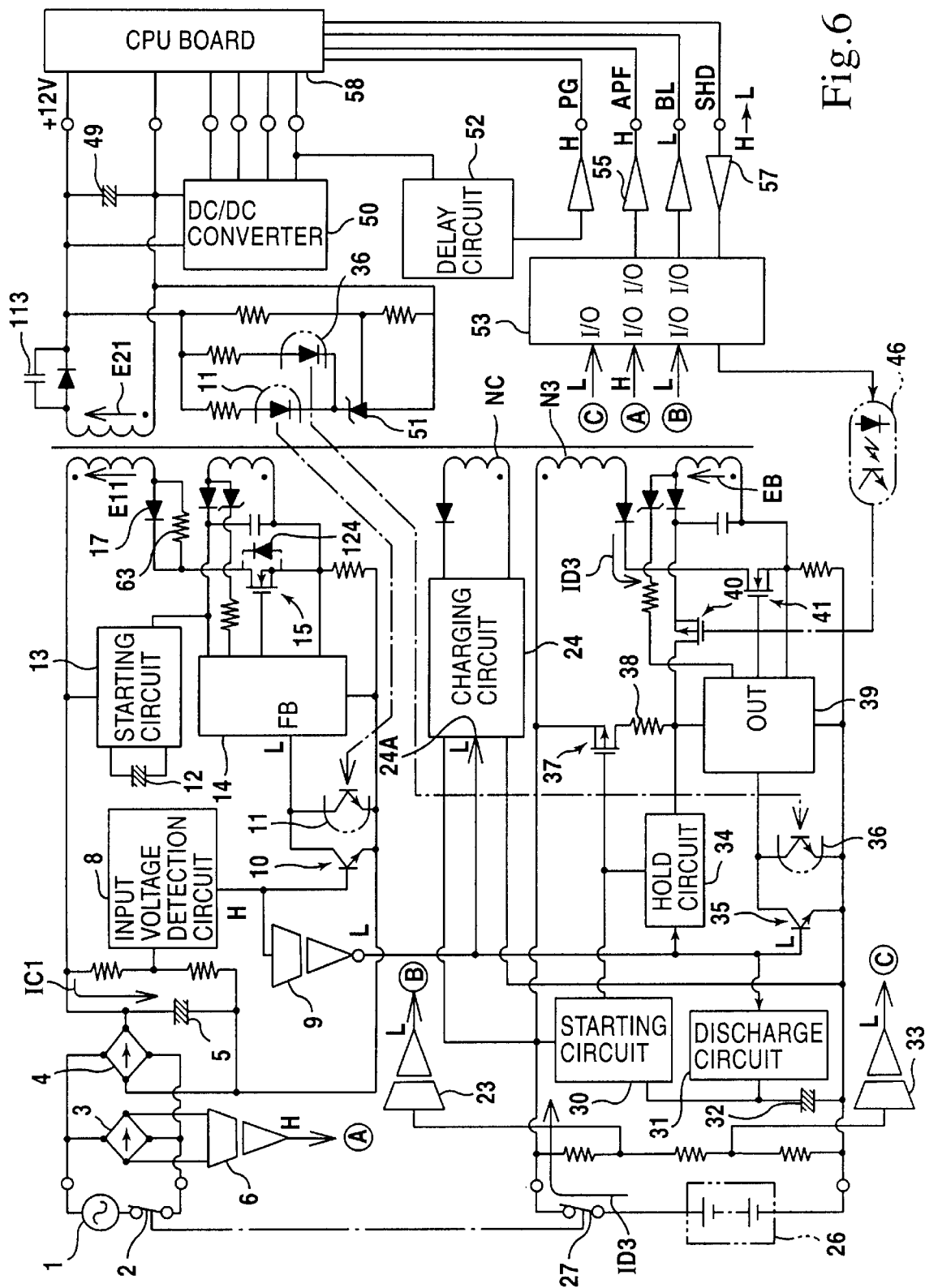
FIG. 6 shows the states of the voltage, current, and signals of the various components during shutdown processing due to AC power supply outage in the circuit diagram of FIG. 4.
Figure 12:
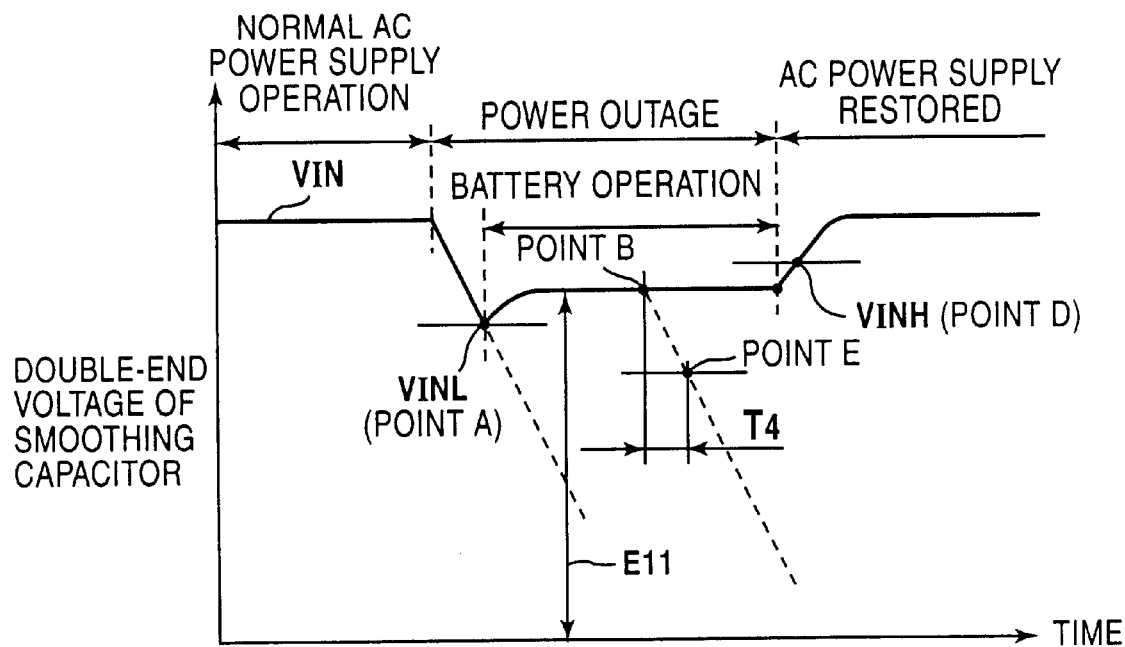
FIG. 12 is a graph of the state of the double-end voltage (VIN) of a smoothing capacitor on the AC side.
Figure 13:
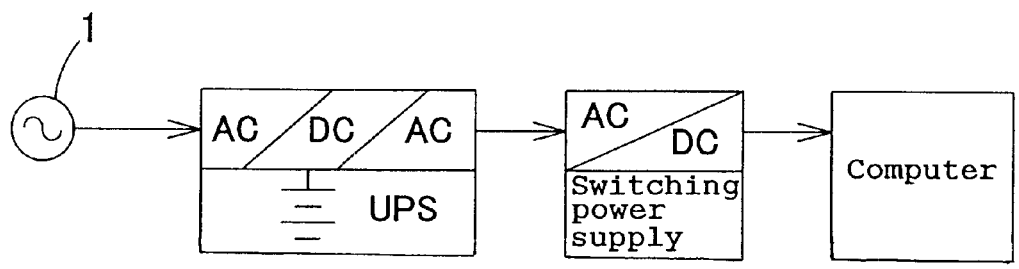
FIG. 13 is a block diagram of a structure featuring a UPS that is a conventional uninterruptible system.
Figure 14:
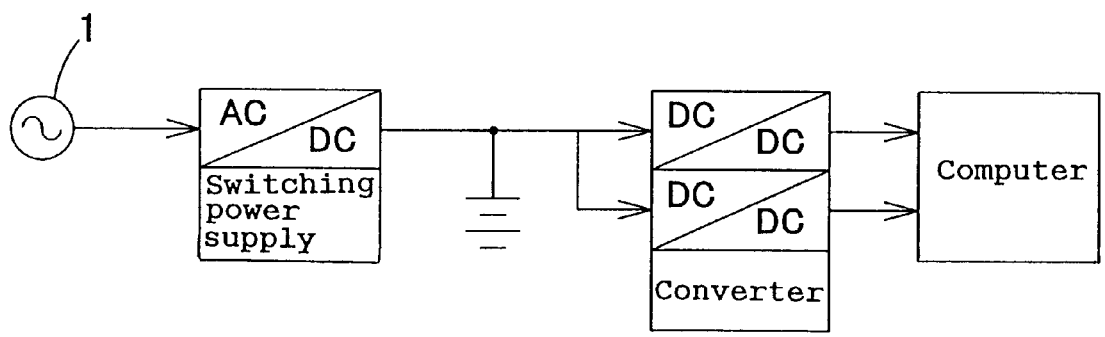
FIG. 14 is a block diagram of the structure of a switching power supply with a conventional internalized uninterruptible function.

This hysteresis also produces an induced voltage E11 to the primary winding N1 resulting from the drain current ID3 of the FET 41 during battery-side RCC circuit operation, that is, when the commercial AC power supply 1 has gone out, and FIGS. 6 and 12 will be used to describe how the current IC1 charges the smoothing capacitor 5 by means of this voltage.

The induced voltage E11 is generated at the polarity indicated by the arrow in FIG. 6, and this voltage causes the current IC1 to flow as a charging current through the smoothing capacitor 5. The return current goes through an over current detection resistor 62, passes in the forward direction of an internal diode 124 of the FET 15, and flows through a feedback resistor 63 connected in parallel to a reverse current element diode 17. As a result, the double-end voltage VIN of the smoothing capacitor 5 is as shown in FIG. 12. During a power outage, VIN decreases, battery-side RCC circuit 69 operation takes over at VINL (point A), and the double-end voltage of the smoothing capacitor 5 rises up to the induced voltage E11. If there is no hysteresis in the input voltage detection circuit 8, this induced voltage E11 will cause the battery-side RCC circuit 69 to revert back to AC-side RCC circuit 21 operation, resulting in a loss of power, so flutter occurs, in which there is a decrease to VINL and switching is repeated over and over. Hysteresis is needed to prevent this, the VINH point (point D) must be set higher than E11, and the value thereof is determined by the resistors 73 and 74 in FIG. 2.

With the raising effect of the feedback resistor 63 on the smoothing capacitor 5, it is rare for a double power outage (AC and battery power outages) to occur due to the battery dying at point B in FIG. 12, but if this should happen, a battery low signal BL is issued at about point B, so about 10 milliseconds of the time T4, which is the time that the secondary DC output voltage serving as the CPU board input voltage is maintained before decreasing to point E at which an unstable region is entered, can be spent by the smoothing capacitor 5, which comprises an electrolytic capacitor, so standby processing time for the memory of the CPU board can be ensured. Next, the operation in the various input states will be described sequentially.

Figure 5:
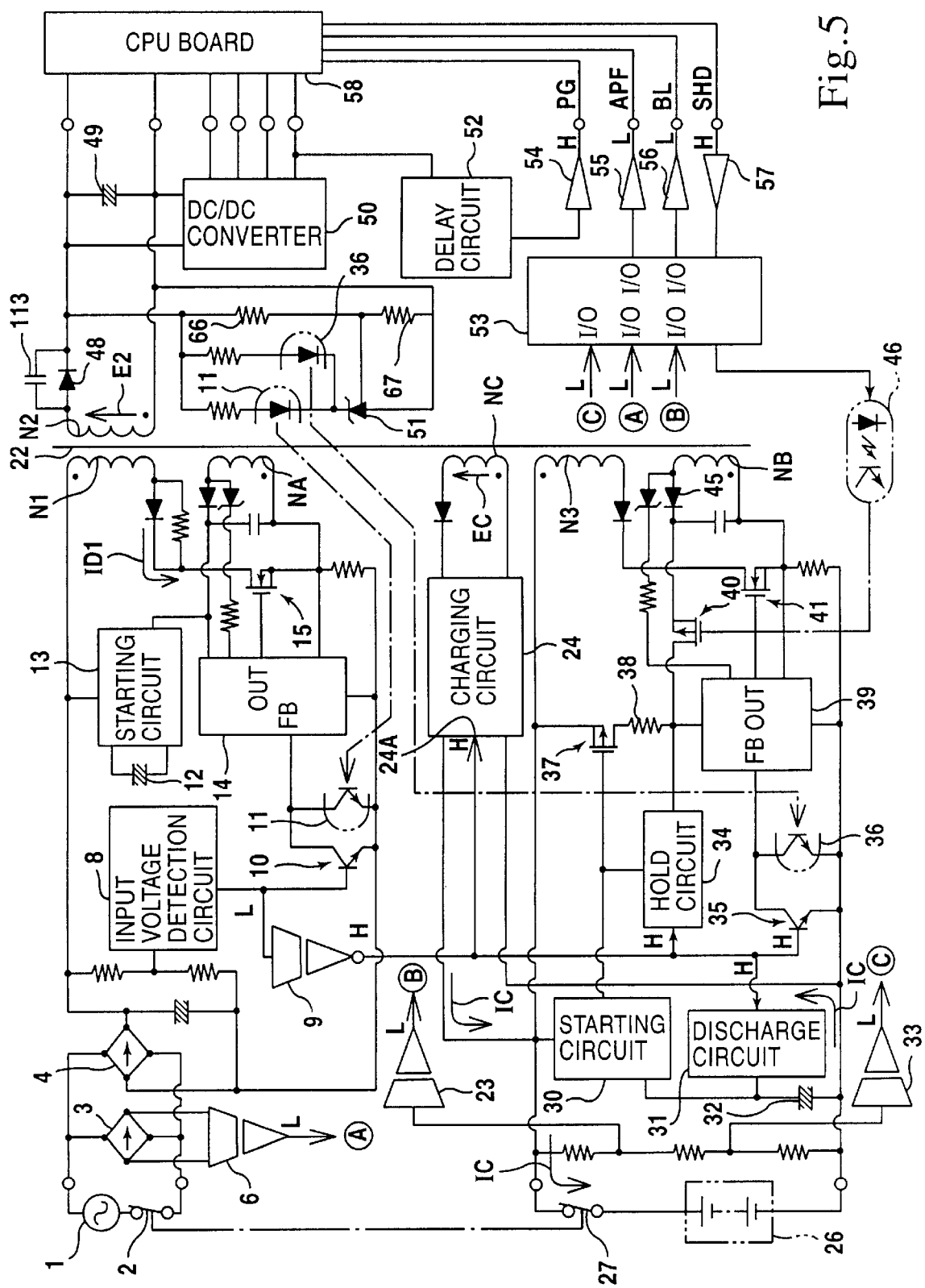
FIG. 5 shows the states of the voltage, current, and signals of the various components during normal AC power supply operation and normal battery operation in the circuit diagram of FIG. 4.

First, a case in which the commercial AC power supply 1 and the battery 26 are both operating normally will be described through reference to FIG. 5.

When a power switch 2 is first turned on, the output of the input voltage detection circuit 8 becomes "L," and the output of the high-speed insulated inverting amplifier 9 becomes "H". When the output "H" of this high-speed insulated inverting amplifier 9 is inputted to a CNT terminal 24A of the charging circuit 24, the charging stop command is rescinded, voltage EC induced at the winding NC of the high-frequency transformer 22 causes a charging current IC to flow to the battery 26, and the battery 26 is charged. If the battery 26 is charged and in a normal state, the outputs of a battery low detection circuit 23 and a charging stop detection circuit 33 will both be at the normal "L" level, so the internal photo-coupler output is transmitted as insulated output to the I/O port of a microcomputer 53 on the secondary side, and after the timing has been adjusted by the microcomputer 53, a BL signal "L" is supplied to the CPU board 58 via a buffer amplifier 56.

The transistor 35 is turned on by the output "H" of the high-speed insulated inverting amplifier 9, as a result of which the collector terminal of the photo-coupler 36 is drawn to "L," making control impossible. Also, since the feedback terminal FB of the battery-side PWM control IC 39 is at "L," the OUT terminal of the battery-side PWM control IC 39 enters a stopped state, and the FET 41 turns off. A starting circuit 30 receives the voltage of the battery 26 after the power switch 2 is turned on, and enters an operating state while a capacitor 32 is being charged. The FET 37 serving as the first switching element is turned on, and VCC voltage is supplied to the battery-side PWM control IC 39. A hold circuit 34 receives the VCC voltage, and if the gate is "H," a negative voltage is imparted to the gate of the FET 37, keeping the FET 37 in an on state.

The output "L" from the input voltage detection circuit 8 causes the transistor 10 to turn off, and the feedback terminal FB of the PWM control IC 14 enters an operating state.

After the power switch 2 has been turned on, a starting circuit 13 supplies the VCC voltage to the PWM control IC 14 while a capacitor 12 is being charged. Next, oscillation output is generated at the OUT terminal of the PWM control IC 14, the gate of the FET 15 is driven, the drive current ID1 flows as exciting current through the primary winding N1 of the high-frequency transformer 22 only during the period while the FET 15 is on, and magnetic energy is stored in the iron core. When the FET 15 is turned off, the magnetic energy stored in the iron core induces a voltage E2 at the secondary winding N2 as flyback voltage, which passes through in the forward direction of the rectifying diode 48 and charges a secondary smoothing capacitor 49, creating a voltage (such as +12 V) that serves as the main output. To keep this main output (such as 12 V) at a constant voltage, the main output is divided by potential detection resistors 66 and 67 and compared with the reference voltage at the gate of a shunt regulator 51 (a comparative amplifying element internal to the reference voltage), current is sent to the photo-diodes of the photo-couplers 11 and 36, and a feedback signal is outputted on the insulated photo-transistor side. Because the photo-coupler 36 is a non-operating state, however, control entails adding the collector potential of the photo-coupler 11 in an operating state to the feedback terminal FB of the PWM control IC 14, and performing on/off control of the FET 15.

As shown in FIG. 1, an improvement in efficiency is achieved by providing the DC/DC converter circuit 50 shown in FIG. 4 with a synchronous rectifying control IC or circuit 114 in which two FET's 115 and 116 are connected in totem pole fashion. As discussed above, in FIG. 4, the DC/DC converter circuit 50 uses the above-mentioned main output (such as 12 V) as its input, creates the voltage required by the CPU board 58, such as four different voltages comprising +5 V, +3.3 V, –12 V, and –5 V, and supplies power to the CPU board 58. In FIG. 1, two different output voltages from the DC/DC converter circuit 50 are created. A PG detection delay circuit 52 detects that the +5 V output has started up at the normal value, and CPU start-up is possible by sending the PG output "H" to the CPU board 58 via a buffer 54 after a specific time delay. The insulated output of an AC voltage level detecting insulated amplifier 6, which detects whether the commercial AC power supply 1 is at the specified level, is controlled by the 26 microcomputer 53, after which an APF signal (normal signal) "L" is outputted to the CPU board 58. At this point, a shutdown command signal is in an "H" signal state expressing non-shutdown. When the shutdown command signal is "H," it is controlled through the microcomputer 53, as a result of which a photo-coupler 46 turns on, a shutdown FET 40 (serving as the second switching element) is turned on, and VCC voltage is supplied to the PWM control IC 39 through a rectifying diode 45 and the winding NB of the high-frequency transformer 22. In this supply of VCC voltage to the PWM control IC 39, going through the FET 40 takes precedence in terms of potential over going through the FET 37 because of the limiting resistor 38.

Next, a shutdown means for performing shutdown processing after the commercial AC power supply 1 has gone out (including a situation in which the voltage from the commercial AC power supply 1 has dropped below the set voltage for one reason or another), and an electronic switch, that is, a switch-off means for switching off the FET 40 after shutdown, will be described through reference to FIG. 6.

When a power outage occurs, the AC voltage level detecting insulated amplifier 6, which has been checking the AC voltage level, determines that there is a power outage, insulated "H" output is inputted to the I/O port of the microcomputer 53, the controlled result is sent through a buffer amplifier 55, and an "H" signal (power outage signal) is inputted as an APF signal to the CPU board 58. On the CPU board 58 side, unless the "H" state of the APF signal is released within the power outage confirmation time set by the shutdown software, termination processing will commence, and upon completion of this work, the shutdown command signal SHD "L" is provided from the CPU board 58 to the shutdown input terminal "SHD" of the uninterruptible switching regulator of the present invention. The shutdown command signal SHD "L" goes through a buffer amplifier 57, is controlled by the microcomputer 53, and is outputted to the photo-coupler 46.

The photo-coupler 46 is turned off, and the gate input of the FET 40 is shut off, which shuts off the VCC supply of the PWM control IC 39 and halts the oscillation of the OUT terminal of the PWM control IC 39. As a result, the FET 41 (battery-side switching element) is cut off, the overall DC output is halted, the battery-side RCC circuit 69 enters a stopped state, and the overdischarging of the battery 26 can be prevented. Once the commercial AC power supply 1 comes back on, the AC-side RCC circuit 21 is restarted and DC voltage is outputted to the secondary drive circuit 25 as above.

When the rectifying voltage at the input voltage detection circuit 8, which has hysteresis, drops below the specified value due to the occurrence of a power outage, an "H" signal is outputted from the input voltage detection circuit 8, and this "H" signal turns on the transistor 10 so that the constant-voltage controlling feedback photo-coupler 11 switches from an operating state to a non-operating state. The signal inputted to the feedback terminal FB of the PWM control IC 14 changes to the "L" level, the OUT terminal of this PWM control IC 14 stops oscillation, and the FET 15 (AC-side switching element) is cut off. The "H" signal of the input voltage detection circuit 8 causes the insulation-side output of the high-speed insulated inverting amplifier 9 to 28 change to "L." The inputting of the "L" signal of the highspeed insulated inverting amplifier 9 to a discharge circuit 31 causes a discharge switch FET 96 to go from an off state to a closed state, but this FET enters a standby state in which discharge is prevented by potential. If the power switch 2 is shut off, discharge is performed. The "H" signal of the input voltage detection circuit 8 causes the CNT terminal 24A of the charging circuit 24 to go to "L, " so the charging circuit 24 enters an off (shut off) state internally. The "H" signal of the input voltage detection circuit 8 also causes the gate input of the hold circuit 34 to go to "L," so the holding state is released, the FET 37 is turned off, and the supply of VCC voltage from the battery 26 to the PWM control IC 39 is halted. The supply of VCC voltage here is limited to that produced by the EB voltage via the FET 40. Since the "H" signal of the input voltage detection circuit 8 also causes the base of the transistor 35 to change to "L," the transistor 35 turns off, and the constant-voltage control feedback photo-coupler 36 of +12 V output becomes active. The VCC voltage to the PWM control IC 39 is being supplied through the FET 40, so an oscillation output is provided to the OUT terminal of the PWM control IC 39, the drain current ID3 flows from the battery 26 through the tertiary winding N3 of the high-frequency transformer 22, and flyback voltage E21 is induced at the secondary winding N2 of the high-frequency transformer 22 by the switching operation of the battery-side RCC circuit 69 instead of the primary winding N1, allowing an output of +12 V to be obtained. The voltage El"L," is induced at the primary winding N1 of the high-frequency transformer 22 by the exciting current ID3, and this voltage causes the charging current IC1 to flow to the input-side smoothing capacitor 5 and raises it to the voltage E11. This is to aid back-up processing by gaining the holding time of the second DC output for the BL signal in the unlikely event of a battery failure or the like. To keep the +12 V output at a constant voltage, the output compared and amplified by the shunt regulator 51 is inputted to the feedback terminal FB of the PWM control IC 39 via the photo-coupler 36, which is in an active state, instead of the photo-coupler 11, which is inactive, and this controls the on and off times of the FET 41 and keeps the voltage constant. Since a continuous output of +12 V can be obtained, the DC/DC converter circuit 50 output to the CPU board 58 is stable, just as during AC-side RCC circuit 21 operation, and normal operation continues until a shutdown command is outputted from the CPU board 58.

Figure 3:
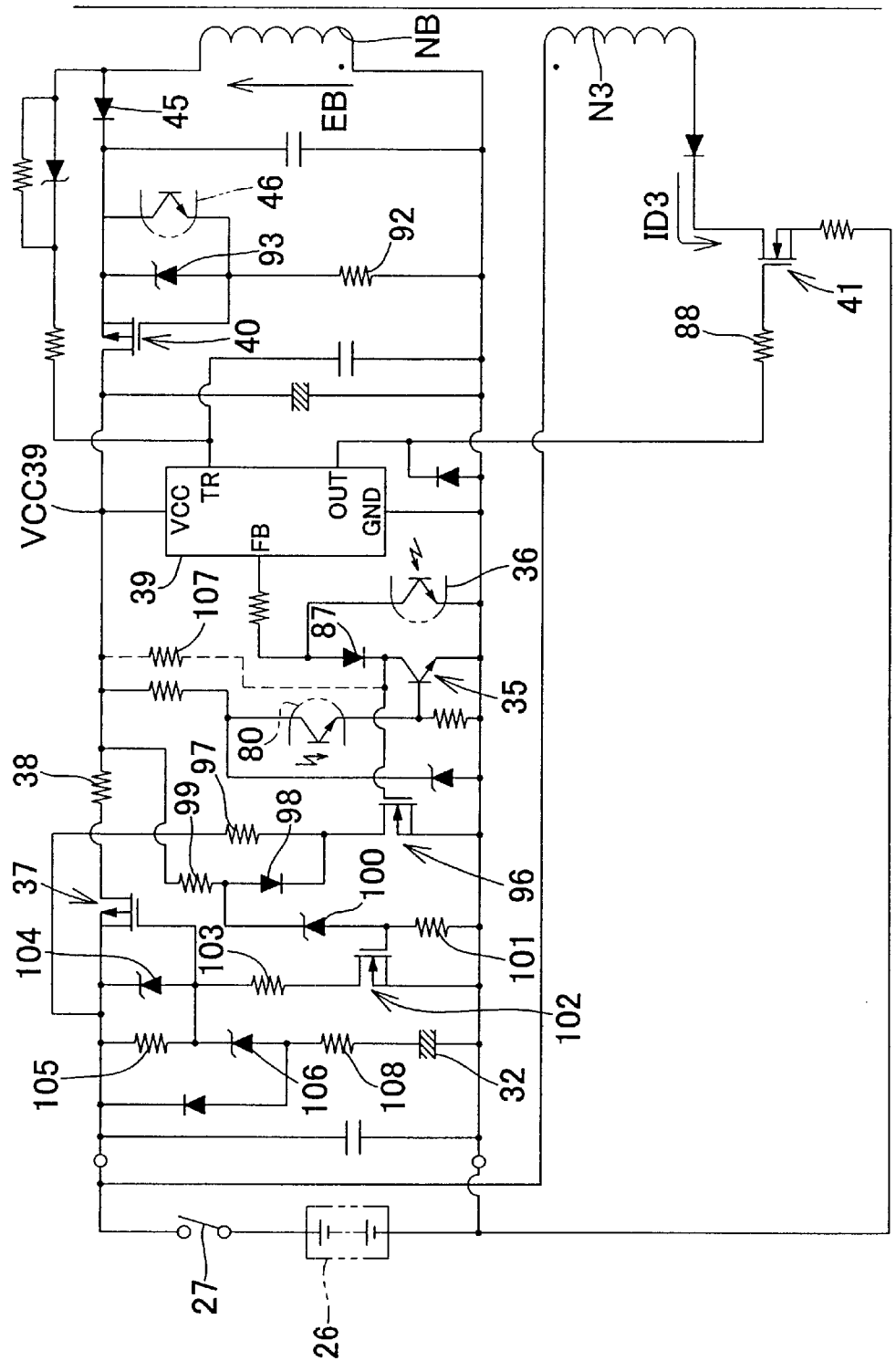
FIG. 3 is a circuit diagram of the battery-side RCC circuit controller.

The start-up and shutdown of the battery-side RCC circuit 69 (not shown, but may be an external DC power supply) when the commercial AC power supply 1 has gone out (including a situation in which the voltage from the commercial AC power supply 1 has dropped below the set voltage for one reason or another), or when there is no commercial AC power supply 1, will now be described through reference to FIG. 3.

When a power switch 27 is turned on using the battery 26 as a DC input, charging current flows to the start-up capacitor 32 through a resistor 105, a Zener diode 106, and a resistor 108, in that order. The drop in voltage of the resistor 105 caused by this charging current turns on the FET 37 by the application of negative voltage to the gate of the 30 electronic switching P-channel FET 37. A Zener diode 104 located between the gate and source shown in the figure serves to control the gate voltage. The VCC voltage of the batteryside RCC circuit controlling IC 39 (hereinafter referred to as VCC39)can be obtained through a current limiting resistor 38 by turning on the FET 37. As a result of obtaining this voltage, the current flowing through a resistor 99 and through a Zener diode 100 imparts a positive voltage bias to the gate of an N-channel FET 102 at a resistor 101 and turns on the FET 102. The result is operation as a hold circuit that continually applies a negative bias from the positive pole of the battery 26 to the gate of the FET 37 through a resistor 105, a resistor 103, and the FET 102. With this hold circuit FET 102, when there is AC input from the commercial AC power supply 1, the photo-transistor 80 is turned on by the output indication of the AC input voltage detection circuit 8, so the transistor 35 is also turned on. As a result, the gate of an N-channel FET 96 is short circuited with respect to the source, so the FET 96 turns off, and there is no lead-in from the diode 98, so the hold circuit holds without resetting.

When the commercial AC power supply 1 is in a power outage state, however, the photo-coupler 80 enters an off state, the transistor 35 is turned off, the feedback terminal of the control IC 39 becomes active, and oscillation output is obtained at the output terminal OUT. Because oscillation voltage is applied through the resistor 88 to the gate of the battery-side switching FET 41, the FET 41 supplies DC output to the secondary side while switching current ID3 whose input is the battery 26 flows through the tertiary winding N3. At the same time, an off feedback voltage EB produced by the exciting current "L," ID3 is obtained at the NB winding. As a result of this voltage EB, a negative voltage, which is controlled by the voltage of a Zener diode 93, is applied to the gate terminal of the P-channel FET 40 (a switching element) through the Zener diode 93 and the resistor 92 after "L," being rectified by the current"L," diode 45, the result of which is that the FET 40 is turned on, and an alternate supply of VCC39 is received at the control IC 39 as energy from the NB winding. A condition here is that the shutdown command photo-coupler 46 is off, that is, there is no shutdown command from the computer.

The VCC39, obtained by receipt of the ON signal of the FET 40, takes strong precedence because there is the limiting resistor 38 from the VCC bias supply obtained from the FET 37 "L," through the starting circuit 30. The VCC39 voltage must be supplied to the IC 39 during the time that the starting circuit 30 continues to operate, which is the time up until the auxiliary winding NB generates voltage, and this is determined by the capacity of the starting capacitor 32. To regress a little, because the photo-coupler 80 is off during a power outage of the commercial AC power supply 1, the transistor 35 is also off, the voltage obtained from the feedback terminal FB of the PWM control IC 39 imparts a positive voltage to the gate of the N-channel FET 96 through the diode 87 (or a circuit connected to the cathode terminal of the diode 87 through the resistor 107 from the VCC39 indicated by the broken line in FIG. 3), and the FET 96 turns on, so the cathode terminal of the Zener diode 100 goes to "L," "L""L," because current from the resistor 99 in the forward direction of the diode 98 is pulled in through the FET 96.

Accordingly, the current flowing through the Zener diode 100 is shut off, the FET 102 that constitutes the hold circuit 34 turns off, and the hold circuit 34 does not operate.

Therefore, when the starting capacitor 32 is charged up, the first switching element FET 37 turns off, and the only supply of VCC39 is the supply of EB voltage from the winding NB.

Also, at this point a discharge resistor 97 and the discharge switching FET 96 are in an on state, and are designed to standby in a state in which discharge is OK at any time. In this state, if an "H" signal is inputted from the CPU board 58 (the load) to the shutdown command input terminal SHD, the signal will be processed by the microcomputer 53 through the buffer amplifier 57 shown in FIG. 4, and the photo-coupler 46 will be switched from off to on, the result of which is that the photo-transistor 46 is short circuited between the gate and source of the electronic switching FET 40 shown in FIG. 3, so the VCC39 voltage supply of the control IC 39 is shut off, the FET 41 (battery-side switching element) is halted, and the entire output is stopped. Restarting is accomplished by re-pressing the switch 27, since once the switch 27 is turned off, the voltage charged in the starting capacitor is discharged almost instantaneously.

Figure 7:
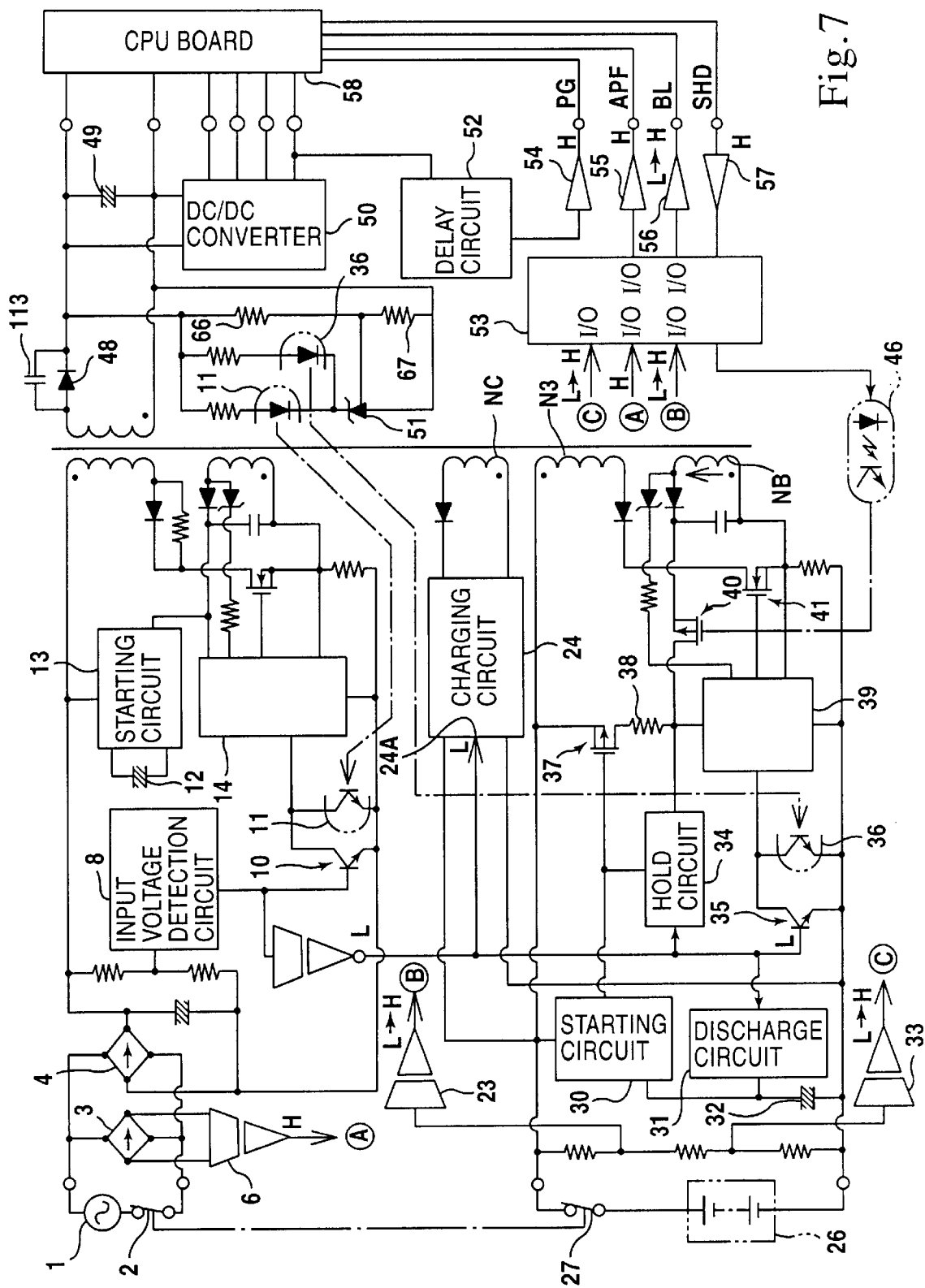
FIG. 7 shows the states of the voltage, current, and signals of the various components when discharge proceeds without any shutdown processing after AC power supply outage in the circuit diagram of FIG. 4.
Figure 11:
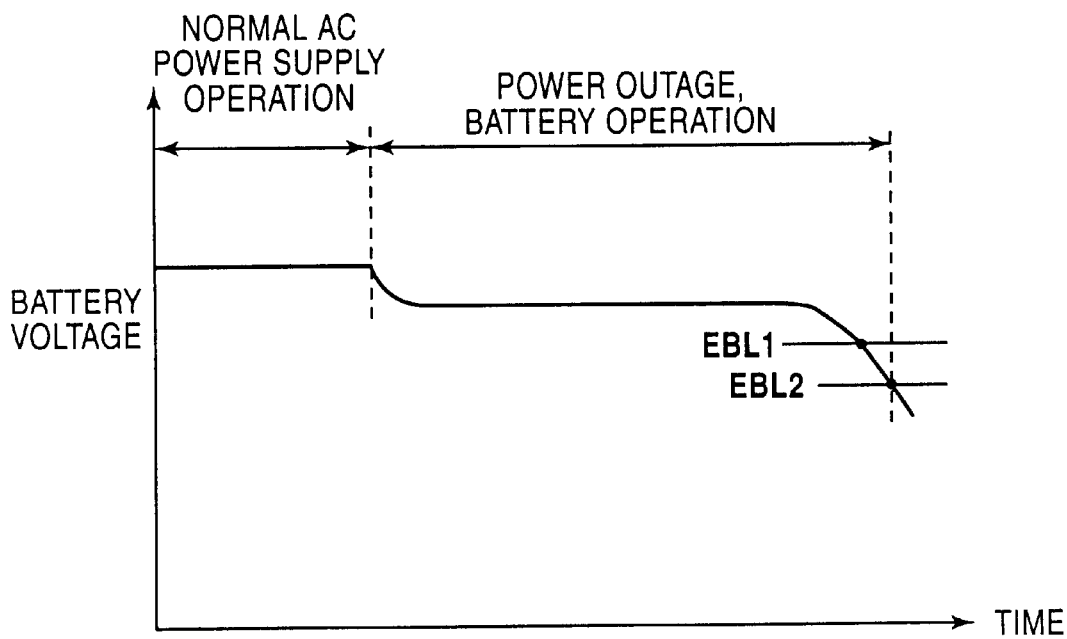
FIG. 11 is a graph of the battery discharge and signals.

Next, if an outage of the commercial AC power supply 1 reoccurs while the battery 26 is in a state of insufficient charge due to repeated power outages or the like, and there is drop in voltage to the EBL1 decrease point (as shown in FIG. 11) while the CPU 58 is performing shutdown processing, and the battery voltage decrease signal BL is outputted as an "H" signal from the insulated battery low detection circuit 23, then after input to the I/O port of the microcomputer 53 as indicated by the arrow B in FIG. 7 and being processed, the "H" signal is outputted to the BL terminal via the buffer amplifier 56 and provided as an emergency signal to the CPU board 58, which orders emergency termination. After this, if the voltage of the battery 26 drops to EBL2 as shown in FIG. 11, it is determined by the discharge detection circuit 33 in FIG. 7 that discharge has been stopped, an "H" signal is outputted to prevent overdischarge, this signal is inputted to the I/O port of the microcomputer 53 as indicated by arrow C, the photo-coupler 46 is turned on, the gate and source of the electronic switching FET 40 are short circuited so that the electronic switching FET 40 is turned off, the supply of VCC39 to the control IC 39 is shut off, and the switching FET 41 is turned off to halt discharge. The discharge cutoff current of the battery 26 here can be kept to just a few microamps, and another feature is that the switching FET 41 serves two purposes, that of a power switch for shutting off the circuit, and performing a switching operation.

There is also an APF signal that serves to notify the CPU board 58 of a power outage or a drop in the commercial AC power supply, and the rectifying bridge 3 and the insulated amplifier 6 are shown in this example as the detection circuit for this signal, but since the input voltage detection circuit 8 and the high-speed insulated inverting amplifier 9 provide similar functions after the AC voltage has been rectified and smoothed, the present invention also encompasses a method in which this circuit is used, that is, arrow A is taken out from the output of the insulated inverting amplifier 9 and put into the I/O port of the microcomputer.

With the first subject matter of the present invention, two RCC type circuits are controlled by detection information from a single input voltage detection circuit, and these two circuits and a secondary drive circuit are used in common via a high-frequency transformer. As a result, efficiency can be raised to over 70"L," %, so a 100 W switching function can be provided to a power supply the size of apparatus called microATX specifications or SFX specifications, which are increasingly requiring smaller sizes in personal computers and various types of server. Also, an uninterruptible switching regulator with high reliability can be provided, without causing a drop in secondary output, by providing high-speed switching means for switching at high speed the operation of the above two circuits on the basis of the detection information from the input voltage detection circuit.

Also, a structure having an input port that moves with a commercial power supply, an AC-side RCC converter circuit, an input port that moves with a battery or external DC power supply completely insulated from this converter circuit, and a battery-side RCC converter circuit corresponding thereto a novel power solution that is capable of input duplexing or multiplexing, with which there is an extremely low probability of the two inputs failing or suffering a power outage, and which provides absolute safety to the servers and so on of a network society that needs to work 24 hours a day, 365 days a year. In the future, it will be possible to use two power supplies that are different from commercial supplies, including fuel cell and solar cell power generation, which are valuable inventions that have already reached the practical stage.

Therefore, there are the benefits of realizing lower energy consumption, less impact on natural resources, and a smaller space requirement, in which the uninterruptible devices currently in wide use and called UPS are not needed.

With the second subject matter of the present invention, the structure is such that when the input voltage from a commercial AC power supply is at or above the set voltage, DC output is supplied from an AC-side RCC type switching circuit to a secondary drive circuit at the output command of an input voltage detection circuit, and when the input voltage from a commercial AC power supply drops below the set voltage, DC output is supplied from a DC-side RCC type switching circuit to the secondary drive circuit at the inverse output command of the input voltage detection circuit. This allows the DC output supplied to the secondary drive circuit to be kept at a constant voltage by a comparative amplifying element. Another advantage is that by using an RCC partial resonance type control IC, or an IC having substantially the same function as this IC, or a control circuit having substantially the same function as this IC, for the PWM control IC as the means for raising the efficiency of the above-mentioned RCC system, there is a reduction in switching and switching noise, and it is easier to deal with EMI.

With the third subject matter of the present invention, the high-speed switching means comprises a high-speed insulated inverting amplifier consisting of a photo-coupler or the like for optically linking the two switching circuits by the photo-transistors provided to the DC-side RCC type switching circuit and the photo-diodes provided to the AC-side RCC type switching circuit, and a clamping Zener diode provided between the collectors and emitters of the phototransistors, and as a result, high-speed response can be achieved inexpensively, without the photo-couplers having to have a super-high-speed structure. Also, these transistors are connected by Darlington connection to the emitter ends of the photo-transistors, diodes are serially connected in the forward direction to the collector side of these transistors, and the cathode sides of these diodes are connected to the feedback terminals of the PWM control IC, and as a result, the forward voltage of the diodes can be utilized so that the feedback terminals of the PWM control IC will not be drawn too deeply into the ground (GND) potential, allowing even better high-speed response to be achieved.

With the fourth subject matter of the present invention, there are provided shutdown processing means for performing shutdown processing by outputting a computer end command when the input voltage detection circuit detects that the input voltage of the commercial AC power supply has dropped below the set voltage, and switch-off means for switching the second electronic switch off and turning the DC-side switching element off by a command from the photo-couplers upon completion of the processing by the shutdown processing means, and as a result, after the shutdown processing, the switching of the DC-side RCC type switching circuit can be halted to halt the supply of power to the secondary side, and the DC-side switching element can be made to double as a power switch, with which the DC-side RCC type switching circuit can be shut off to keep dark current caused by wasted discharge down to just a few micro-amps. There is no need for a mechanical relay with a large shut-off capacity, and the simplification of the circuits allows costs to be lowered and the power supply to be made more compact.

With the fifth subject matter of the present invention, a resonance capacitor is connected to either the winding end portion of the primary winding or the winding end portion of the tertiary winding, and the secondary drive circuit is provided with a synchronous rectifying circuit in which two FET's are connected in totem pole fashion to a DC/DC converter circuit that makes a low-voltage large-current output and a polymer semiconductor capacitor or a capacitor with substantially the same low equivalent serial resistance as a polymer semiconductor capacitor, and as a result, there is an improvement in efficiency, and simpler circuits allow for a more compact design.

With the sixth subject matter of the present invention, the structure of the high-frequency transformer is design so as to provide a switching regulator that reduces parasitic inductance, reduces the range and amount of cross-boarding (the region where the drain current and voltage overlap) when the FET that is a switching element is turned off, and allows efficiency to be increased and noise reduced, which is useful in terms of usage and energy conservation.

What is claimed is:

1. An uninterruptible switching regulator,
   wherein an AC-side RCC type switching circuit equipped with a switching element, which rectifies and converts into DC an AC voltage from a commercial AC power supply serving as the input source and then operates using the smoothed DC voltage as its input, is connected to the primary winding of a high-frequency transformer,
   there is provided an input voltage detection circuit that detects when the input voltage from the commercial AC power supply to the AC-side RCC type switching circuit drops below a set voltage, a secondary drive circuit for driving a load such as a computer board is connected to the secondary winding of the high-frequency transformer,
   a DC-side RCC type switching circuit equipped with a switching element, which is completely electrically insulated from the AC-side RCC type switching circuit and the secondary drive circuit and operates using a battery, an external DC power supply, or the like as its input source, is connected to the tertiary winding of the high-frequency transformer,
   there is provided high-speed switching means for switching at high speed the operation of the AC-side RCC type switching circuit and the DC-side RCC type switching circuit on the basis of the detection information from the input voltage detection circuit,
   when the input voltage detection circuit detects that the input voltage from the commercial AC power supply is at or above the set voltage, the operation of the DC-side RCC type switching circuit is halted and power is supplied to the secondary drive circuit by preferentially operating the AC-side RCC type switching circuit with an output command from the input voltage detection circuit, and
   when the input voltage detection circuit detects that the input voltage from the commercial AC power supply has dropped below the set voltage, power is supplied to the secondary drive circuit by operating the DC-side RCC type switching circuit and halting the operation of the AC-side RCC type switching circuit with a reverse output command from the input voltage detection circuit, and further,
   wherein there is provided a comparative amplifying element with an internal reference voltage for keeping the DC output to the secondary drive circuit at a constant voltage,
   the photo-diode sides of two photo-couplers are connected to the output terminal of this comparative amplifying element, either serially or in parallel via a balance resistor,
   the photo-transistors of the two photo-couplers are disposed one in the AC-side RCC type switching circuit and the other in the DC-side RCC type switching circuit,
   the collector terminals of the two photo-transistors are connected to the feedback input terminals of a PWM control IC used to control the switching circuits,
   the emitter terminals of the two photo-transistors are connected to the ground terminal of the PWM control IC,
   there are provided two transistors whose collector terminals are connected to the collector terminals of the two photo-transistors and whose emitter terminals are connected to the emitter terminals thereof,
   the base terminals of the two transistors and the input voltage detection circuit are connected such that the output commands from the input voltage detection circuit can be transmitted to the two base terminals in a mutually inverted state, and
   an RCC partial resonance type control IC, or an IC having substantially the same finction as said IC, or a control circuit having substantially the same finction as said IC, is used as the PWM control IC.

2. An uninterruptible switching regulator, wherein an AC-side RCC type switching circuit equipped with a switching element, which rectifies and converts into DC an AC voltage from a commercial AC power supply serving as the input source and then operates using the smoothed DC voltage as its input, is connected to the primary winding of a high-frequency transformer, there is provided an input voltage detection circuit that detects when the input voltage from the commercial AC power supply to the AC-side RCC type switching circuit drops below a set voltage, a secondary drive circuit for driving a load such as a computer board is connected to the secondary winding of the high-frequency transformer, a DC-side RCC type switching circuit equipped with a switching element, which is completely electrically insulated from the AC-side RCC type switching circuit and the secondary drive circuit and operates using a battery, an external DC power supply, or the like as its input source, is connected to the tertiary winding of the high-frequency transformer, there is provided high-speed switching means for switching at high speed the operation of the AC-side RCC type switching circuit and the DC-side RCC type switching circuit on the basis of the detection information from the input voltage detection circuit, when the input voltage detection circuit detects that the input voltage from the commercial AC power supply is at or above the set voltage, the operation of the DC-side RCC type switching circuit is halted and power is supplied to the secondary drive circuit by preferentially operating the AC-side RCC type switching circuit with an output command from the input voltage detection circuit, and when the input voltage detection circuit detects that the input voltage from the commercial AC power supply has dropped below the set voltage, power is supplied to the secondary drive circuit by operating the DC-side RCC type switching circuit and halting the operation of the AC-side RCC type switching circuit with a reverse output command from the input voltage detection circuit, and Other, wherein the high-speed switching means comprises a high-speed insulated inverting amplifier consisting of a photo-coupler or the like for optically linking the two switching circuits by the phototransistors provided to the DC-side RCC type switching circuit and the photo-diodes provided to the AC-side RCC type switching circuit, and a clamping Zener diode provided between the collectors and emitters of the photo-transistors, transistors are connected by Darlington connection to the emitter terminals of the phototransistors, diodes are serially connected in the forward direction to the collector side of these transistors, and the cathode sides of these diodes are connected to the feedback terminals of the PWM control IC.

3. An uninterruptible switching regulator, wherein an AC-side RCC type switching circuit equipped with a switching element, which rectifies and converts into DC an AC voltage from a commercial AC power supply serving as the input source and then operates using the smoothed DC voltage as its input, is connected to the primary winding of a high-frequency transformer, there is provided an input voltage detection circuit that detects when the input voltage from the commercial AC power supply to the AC-side RCC type switching circuit drops below a set voltage, a secondary drive circuit for driving a load such as a computer board is connected to the secondary winding of the high-frequency transformer, a DC-side RCC type switching circuit equipped with a switching element, which is completely electrically insulated from the AC-side RCC type switching circuit and the secondary drive circuit and operates using a battery, an external DC power supply, or the like as its input source, is connected to the tertiary winding of the high-frequency transformer, there is provided high-speed switching means for switching at high speed the operation of the AC-side RCC type switching circuit and the DC-side RCC type switching circuit on the basis of the detection information from the input voltage detection circuit, when the input voltage detection circuit detects that the input voltage from the commercial AC power supply is at or above the set voltage, the operation of the DC-side RCC type switching circuit is halted and power is supplied to the secondary drive circuit by preferentially operating the AC-side RCC type switching circuit with an output command from the input voltage detection circuit, and when the input voltage detection circuit detects that the input voltage from the commercial AC power supply has dropped below the set voltage, power is supplied to the secondary drive circuit by operating the DC-side RCC type switching circuit and halting the operation of the AC-side RCC type switching circuit with a reverse output command from the input voltage detection circuit, and further, wherein there are provided two supply circuits for supplying voltage to the PWM control IC used in the DC-side RCC type switching circuit, one of the supply circuits is equipped with a first electronic switch that passes the DC voltage from the battery, external DC power supply, or the like through a starting circuit and closes only while charging current is flowing to a starting capacitor, the other supply circuit is equipped with a second electronic switch for supplying the DC-side PWM control IC with auxiliary voltage made by rectifying the induced voltage of the tertiary winding after the supply of DC voltage from the first electronic switch has been received and the high-frequency transformer is in an oscillating state, and there are provided:

shutdown processing means for performing shutdown processing by outputting a computer end command when the input voltage detection circuit detects that the input voltage of the commercial AC power supply has dropped below the set voltage; and switch-off means for switching the second electronic switch of f and turning the DC-side switching element of f by a command from the photo-couplers upon completion of the processing by the shutdown processing means.

4. The uninterruptible switching regulator according to any one of claims 1 to 3, wherein a resonance capacitor is connected to either the winding end portion of the primary winding or the winding end portion of the tertiary winding, and the secondary drive circuit is provided with a synchronous rectifying circuit in which two FET's are connected in totem pole fashion to a DC/DC converter circuit that makes a low-voltage large-current output and a polymer semiconductor capacitor or a capacitor with substantially the same low equivalent serial resistance as a polymer semiconductor capacitor.

5. The uninterruptible switching regulator according to any one of claims 1 to 3, wherein the high-frequency transformer comprises:

an iron core;

an inner secondary winding around the iron core, whose number ofturns is substantially half the total number of turns of the secondary winding;

a tertiary winding wound around the outside of this inner secondary winding with an interlayer insulator interposed therebetween;

a primary winding that is a high-voltage winding wound around the outside of this tertiary winding with an interlayer insulator interposed therebetween; and an outer secondary winding around the outside of this primary winding, whose number of turns is the remainder of subtracting the number of turns of the inner secondary winding from the total number of turns of the secondary winding, the inner secondary winding, the tertiary winding, and the outer secondary winding are made from flat copper plates, and the winding width of the inner secondary winding. the tertiary winding, and the outer secondary winding is the same as the winding width of the primary winding made of round wire.

* * * * *